(12) United States Patent
Munk

(10) Patent No.: US 7,040,572 B2
(45) Date of Patent: May 9, 2006

(54) LIGHTER-THAN-AIR AIRCRAFT WITH AIR CUSHION LANDING GEAR MEANS

(75) Inventor: Jeffrey R Munk, Aylesbury (GB)

(73) Assignee: Advanced Technologies Group Limited, Bedfordshire (GB)

( * ) Notice: Subject to any disclaimer, the term of this patent is extended or adjusted under 35 U.S.C. 154(b) by 0 days.

(21) Appl. No.: 10/497,255

(22) PCT Filed: Dec. 5, 2002

(86) PCT No.: PCT/GB02/05506

§ 371 (c)(1),
(2), (4) Date: Nov. 26, 2004

(87) PCT Pub. No.: WO03/047967

PCT Pub. Date: Jun. 12, 2003

(65) Prior Publication Data

US 2005/0082426 A1    Apr. 21, 2005

(30) Foreign Application Priority Data

Dec. 5, 2001    (GB) .................................... 0129153

(51) Int. Cl.
*B64C 25/00*    (2006.01)
(52) U.S. Cl. .................. 244/100 R; 244/30; 244/100 A
(58) Field of Classification Search ............ 244/100 A, 244/100 R, 101, 102 R, 103 R, 105, 106, 244/24; 114/121–126, 54, 288, 61, 25, 345, 114/261, 262; 305/34
See application file for complete search history.

(56) References Cited

U.S. PATENT DOCUMENTS

| | | | | |
|---|---|---|---|---|
| 1,257,413 A | * | 2/1918 | Sloper .................... | 244/100 A |
| 2,463,351 A | * | 3/1949 | Bowers ................... | 244/100 A |
| 3,004,737 A | * | 10/1961 | Lehberger et al. ...... | 244/100 A |
| 3,102,705 A | * | 9/1963 | Namsick ................. | 244/100 A |
| 3,288,235 A | * | 11/1966 | Jones ......................... | 180/122 |
| 3,412,956 A | * | 11/1968 | Cockerell ..................... | 244/2 |
| 3,524,517 A | * | 8/1970 | La Fleur ..................... | 180/124 |
| 3,672,461 A | * | 6/1972 | Riddle et al. ............... | 180/127 |
| 3,727,716 A | * | 4/1973 | Jenkins ........................ | 180/124 |
| 3,738,597 A | * | 6/1973 | Earl et al. ................ | 244/100 A |
| 3,790,110 A | * | 2/1974 | Earl ....................... | 244/110 H |
| 3,802,602 A | * | 4/1974 | Wilson .................... | 244/100 R |
| 3,826,449 A | * | 7/1974 | Nelson et al. ........... | 244/100 R |
| 3,844,509 A | * | 10/1974 | Jenkins ................... | 244/100 A |
| 3,865,332 A | * | 2/1975 | Coles ...................... | 244/102 R |
| 3,869,103 A | * | 3/1975 | Nelson et al. ........... | 244/100 R |
| 3,963,198 A | * | 6/1976 | Vaughan .................. | 244/100 A |

(Continued)

FOREIGN PATENT DOCUMENTS

FR    1 457 744    *    1/1966

(Continued)

*Primary Examiner*—Teri Pham Luu
*Assistant Examiner*—S A Holzen
(74) *Attorney, Agent, or Firm*—Stephen H. Eland; Dann, Dorfman, Herrell and Skillman

(57) ABSTRACT

A lighter-than-air aircraft (1) having a gas-filled hull (2) and a pair of spaced apart landing gear units (11, 12) on the underside of the hull arranged on opposite sides of a longitudinally extending central vertical plane of the hull. Each landing gear unit (11, 12) comprises bag skirt means (5–7, 5'–7'), means for supplying air to and removing air from the bag skirt means and actuating means operable to move the bag skirt means between an operative configuration for containing one or more air cushions and an inoperative configuration.

20 Claims, 4 Drawing Sheets

U.S. PATENT DOCUMENTS

| | | | | |
|---|---|---|---|---|
| 3,964,698 A | * | 6/1976 | Earl | 244/100 A |
| 3,990,533 A | * | 11/1976 | Henry | 180/127 |
| 3,990,658 A | * | 11/1976 | Letsinger | 244/100 A |
| 4,004,761 A | * | 1/1977 | McAvoy | 244/100 A |
| 4,019,698 A | * | 4/1977 | Earl | 244/110 A |
| 4,032,088 A | * | 6/1977 | McAvoy | 244/100 A |
| 4,068,606 A | * | 1/1978 | Van Veldhuizen | 114/67 A |
| 4,077,589 A | * | 3/1978 | Belolipetsky et al. | 244/100 A |
| 4,133,282 A | * | 1/1979 | Cockerell | 114/67 A |
| 4,169,514 A | * | 10/1979 | Wheeler et al. | 180/127 |
| 4,187,999 A | * | 2/1980 | Black | 244/12.5 |
| 4,383,664 A | * | 5/1983 | Perez | 244/100 A |
| 4,645,142 A | * | 2/1987 | Soelter | 244/100 A |
| 4,697,762 A | * | 10/1987 | Arney | 244/101 |
| 4,757,962 A | * | 7/1988 | Grant | 244/12.3 |
| 4,828,058 A | * | 5/1989 | Bjorn-Ake | 180/116 |
| 4,923,145 A | * | 5/1990 | Broadhurst | 244/100 A |
| 5,259,574 A | * | 11/1993 | Carrot | 244/100 A |
| 5,560,443 A | * | 10/1996 | DuBose | 180/121 |
| 5,622,133 A | * | 4/1997 | Sinitsyn et al. | 114/272 |
| 5,683,060 A | | 11/1997 | Iturralde | |
| 5,909,857 A | | 6/1999 | Filimonov | |
| 6,315,242 B1 | * | 11/2001 | Eichstedt et al. | 244/30 |
| 6,880,783 B1 | * | 4/2005 | Munk | 244/25 |
| 2003/0001044 A1 | * | 1/2003 | Munk | 244/24 |
| 2003/0057322 A1 | * | 3/2003 | Parrott et al. | 244/106 |
| 2004/0112268 A1 | * | 6/2004 | Maloney et al. | 114/288 |
| 2005/0022308 A1 | * | 2/2005 | Totton et al. | 5/713 |

FOREIGN PATENT DOCUMENTS

| | | | |
|---|---|---|---|
| FR | 1457774 | | 1/1966 |
| WO | 01/72588 | | 10/2001 |
| WO | 01/94172 | | 12/2001 |
| WO | WO 01 72588 | * | 10/2005 |
| WO | WO 01 94172 | * | 12/2005 |

* cited by examiner

LIGHTER-THAN-AIR AIRCRAFT WITH AIR CUSHION LANDING GEAR MEANS

This invention relates to an aircraft of the kind having a hull filled with lighter than air gas (hereinafter referred to as a "lighter-than-air aircraft") and a pair of retractable landing gear means arranged so as to be spaced apart on either side of longitudinally extending central vertical plane of the aircraft. In particular, but not exclusively, the invention relates to airships such as non-rigid airships.

Known lighter-than-air aircraft in the form of airships have wheels on the underside of the hull to facilitate the landing and taking off of the airship. Such wheels are in lowered positions when in use for landing and taking off but may be retracted when the airship is in flight to reduce drag. It has also been proposed to provide a lighter-than-air aircraft, in the form of a hybrid air vehicle which combines the characteristics of an airplane, a lighter-than-air airship and a hovercraft, with laterally spaced apart longitudinally extending air cushion landing gear units. These landing gear units support the hull on cushions of air, normally bounded by so-called "skirts", but are not designed to retract in use.

The present invention seeks to provide a lighter-than-air aircraft fitted with retractable air cushion landing gear means.

According to the present invention there is provided a lighter-than-air aircraft having a gas-filled hull and a pair of spaced apart landing gear means on the underside of the hull arranged on opposite sides of a longitudinally extending central vertical plane of the hull, characterised in that each landing gear means comprises an air cushion unit including bag skirt means, means for supplying air to and removing air from the bag skirt means and actuating means operable to move the bag skirt means between an operative configuration for containing one or more air cushions and an inoperative configuration. Preferably the bag skirt means of the two air cushion units, when in their operative configurations, are inflated and extend downwardly from the underside of the hull to define downwardly open air cavities in which the air cushions are created and when in their inoperative configurations are positioned closer to the underside of the hull.

By positioning the bag skirt means closer to the underside of the hull when in their inoperative configurations the air cushion units are drawn or collapsed towards the underside of the hull and provide the lighter-than-air aircraft with a more streamlined shape.

Preferably the bag skirt means of each air cushion unit comprises first and second bag skirts extending along opposite sides of the air cushion unit and provided with engageable and disengageable connecting means, and the actuating means is operable to connect the connecting means together in the inoperative configuration of the bag skirt means and to disconnect the connecting means when the bag skirt means are moved into their operative configuration. In its simplest form the connecting means comprise connections of a zip fastener or the like, the actuating means moving a slider portion to engage or disengage rows of teeth on the first and second bag skirts. Each bag skirt means, in addition to the longitudinally extending and spaced apart bag skirts, may include longitudinally spaced apart transverse skirts extending between the bag skirts and providing with the bag skirts at least one air cavity.

Preferably each bag skirt comprises an inflatable and deflatable bladder means secured to the underside of the hull. The means for supplying and removing air to the bag skirt means is intended to fully inflate the bladder means in the operative configurations of the bag skirt means with air being fed at the same time into the air cavities to provide the air cushions, As is conventional in hovercraft design, the air fed into the inflated bladder means may be allowed to escape, e.g. through holes on the inside edge of the bladder means, into the air cavities. When the bag skirt means are moved to their inoperative configurations, the bladder means are at least partially deflated and the actuating means are operated to draw together, and connect together, the at least partially deflated bladder means. When joined together the space enclosed by the connected together, at least partially deflated, bladder means may be partly filled or inflated with air to stabilise the cushion unit. In this "collapsed" condition the outside envelope provided by the bladder means is positioned closer to the hull than the bladder means when in their operative positions.

Conveniently each bag skirt may have a curtain type skirt suspended therefrom.

Embodiments of the invention will now be described, by way of example only, with specific reference to the accompanying drawings, in which.

Figure 1:
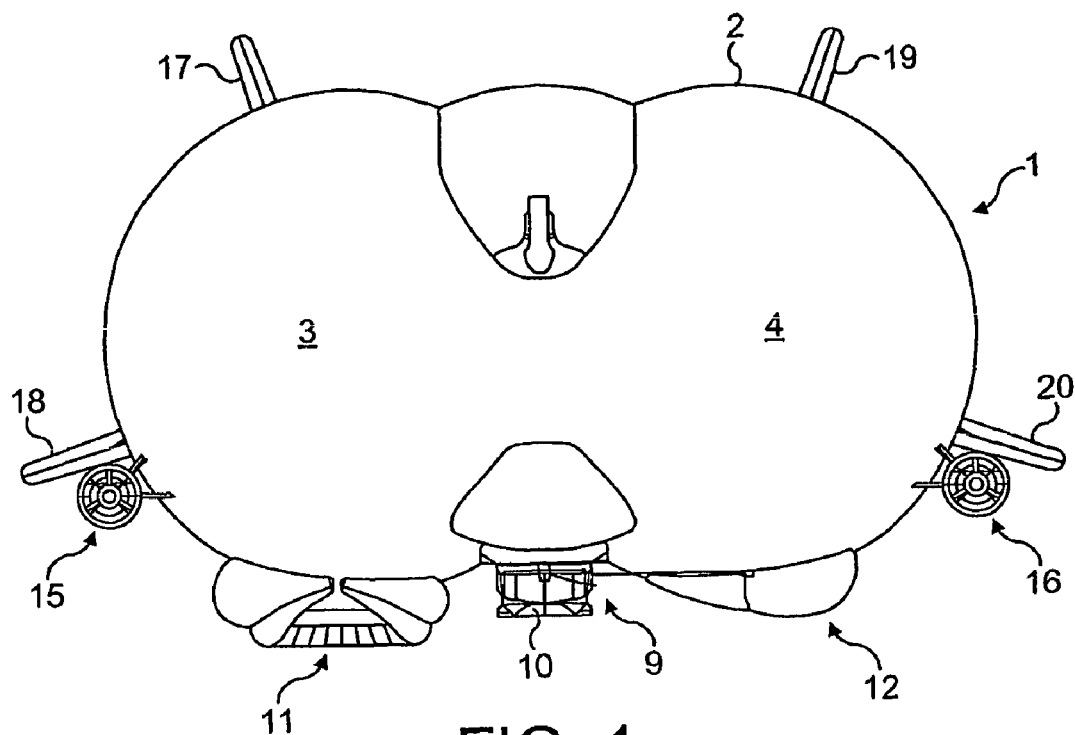
FIGS. 1 to 4 are schematic views from the front, the rear, one side and below of a lighter-than-air aircraft according to the present invention.
Figure 2:
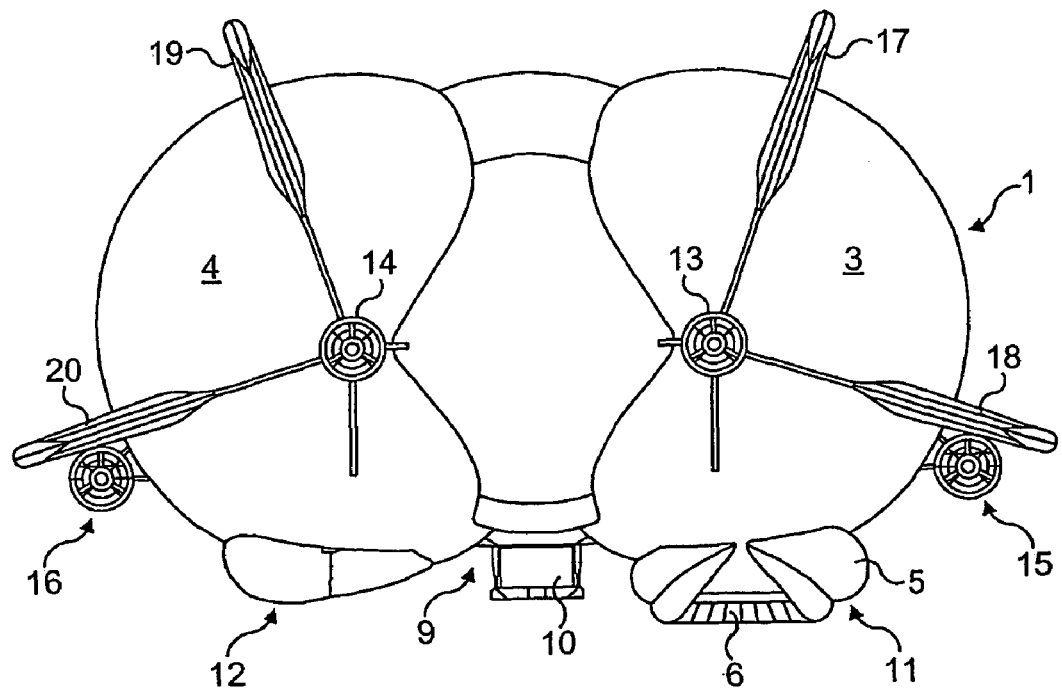
Figure 3:
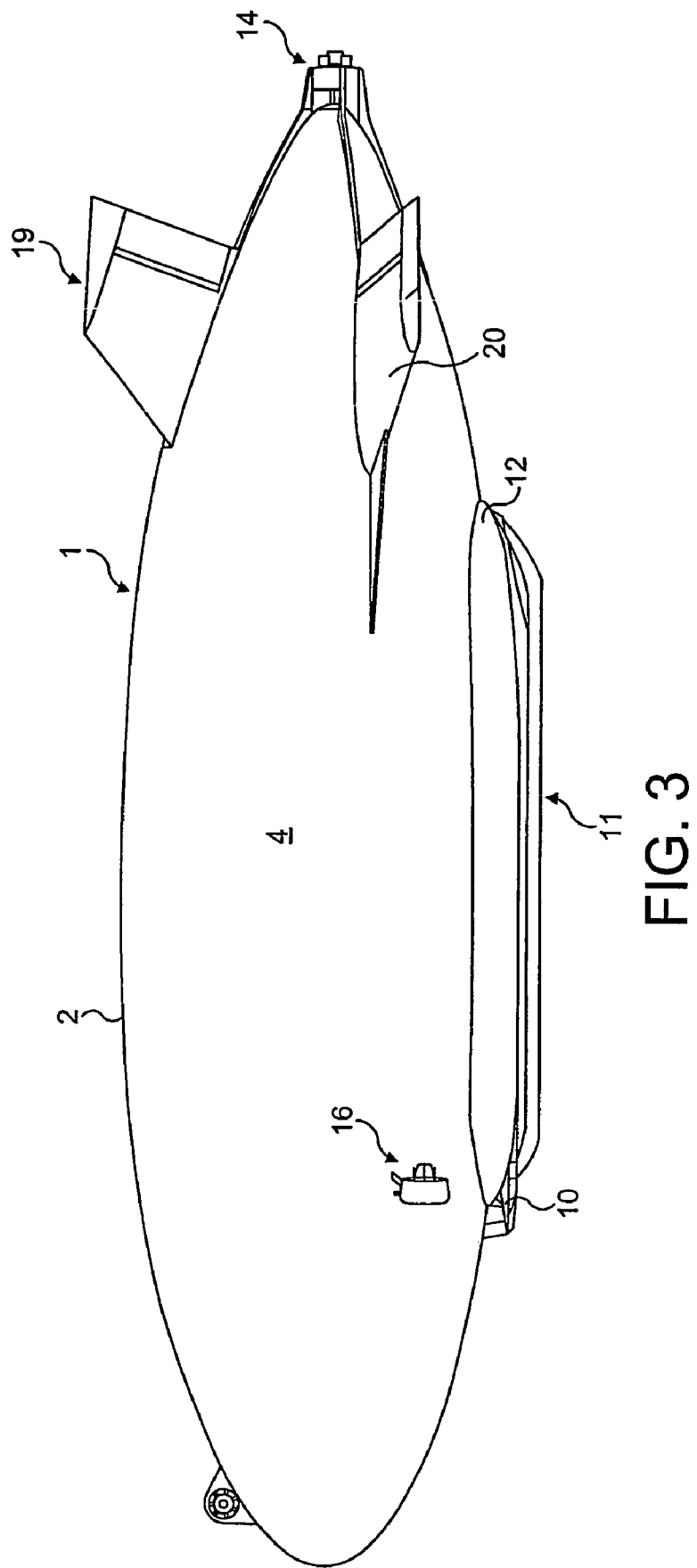
Figure 4:
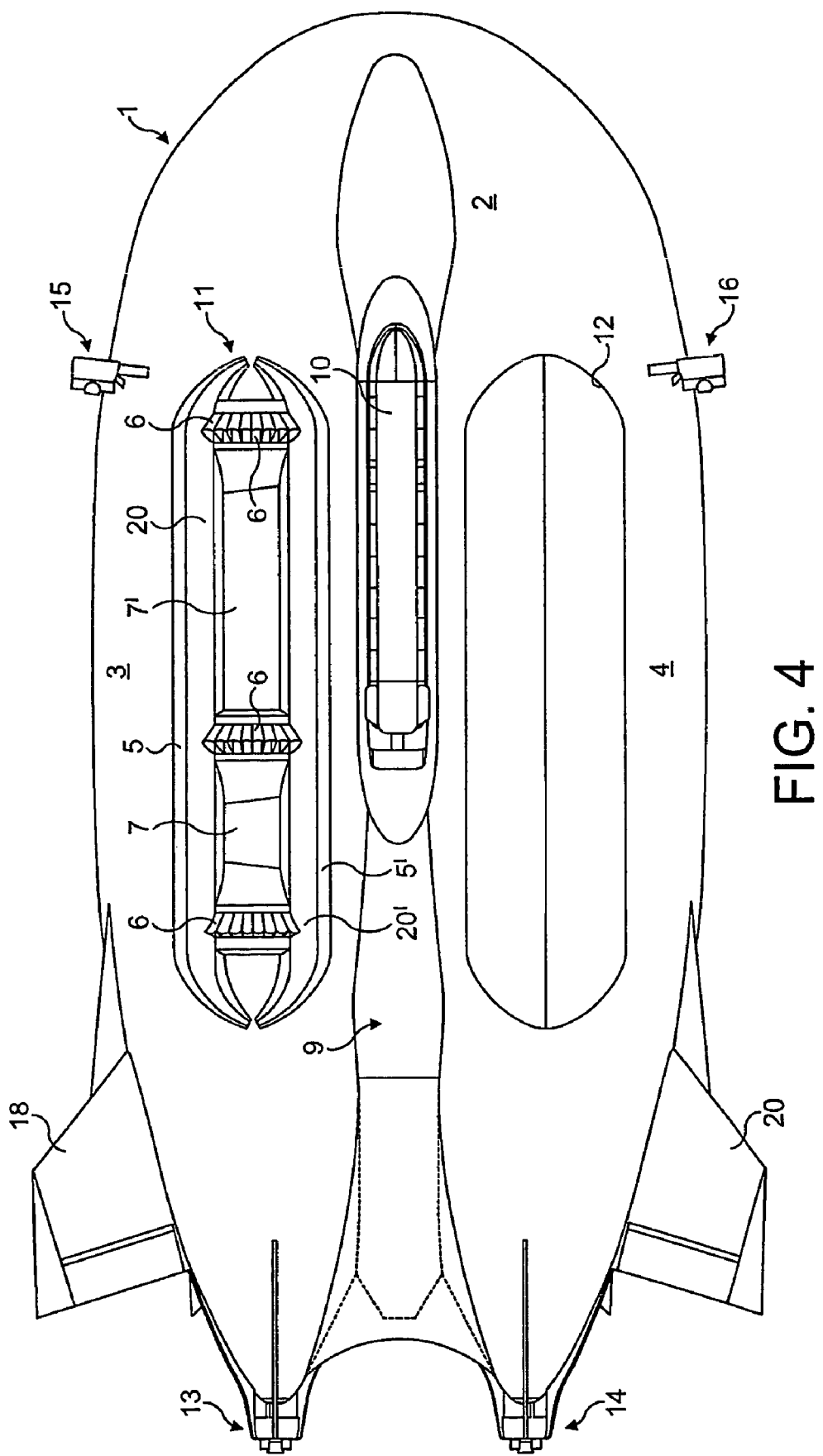
Figure 5:
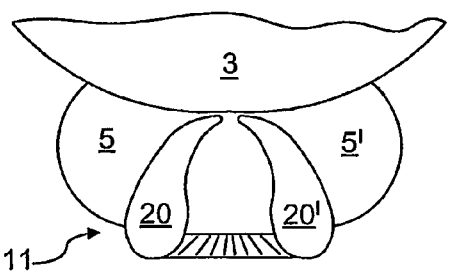
FIG. 5-7 are schematic views illustrating three positions of an air cushion unit of the aircraft shown in FIGS. 1 to 4 moving from an operative position to an inoperative position.
Figure 6:
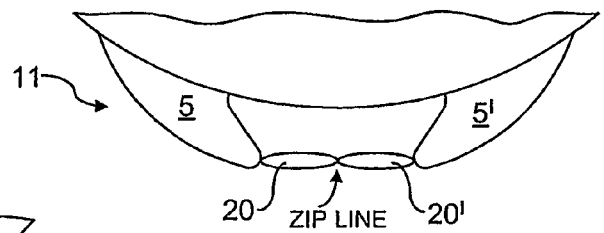
Figure 7:
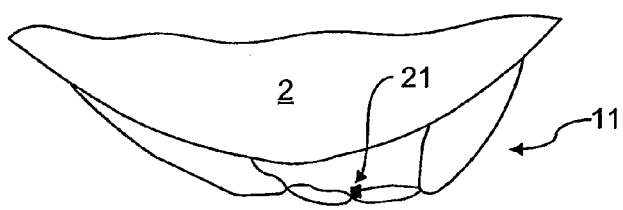

FIGS. 1 to 4 show a lighter-than-air aircraft according to the invention generally designated by the reference numeral 1. The aircraft is in the form of a pressure-stabilised, preferably non-rigid having a hull 2 with a flattened, generally elliptical cross-section throughout most of its length. The hull 2 is formed of two longitudinally extending side lobes 3 and 4 and is made from reinforced sheet material, e.g. a high strength laminated fabric. The lighter-than-air gas within the hull is conveniently helium.

The sheet material from which the hull is formed is cut into precise, flat shapes which are bonded together to provide the precise curved shape of the hull. When the lobes are filled with helium the pressure stabilised hull is formed having a camber along its length. The two side lobes 3 and 4 are in effect joined, or positioned close together, at the underside of the hull and define a central longitudinal concave surface or recess 9 along the length of the hull. The inflated hull is of a flattened form and has a generally aerodynamic shape which is able to provide aerodynamic lift to the aircraft. Typically, with the design illustrated, approximately one-quarter to one half of the aircraft lift is provided aerodynamically through its lifting body shape and approximately one half to three-quarters of the aircraft lift is provided by the buoyancy of the hull gas, e.g. helium. In longitudinal section, the hull has a generally greater convexity on the top side than on the underside.

The underside of the air vehicle 1 includes a longitudinally extending gondola or payload module 10 positioned in the recess 9 and air cushion landing gear units 11 and 12 on the hull lobes 3 and 4, respectively. The positioning of these units is facilitated by the generally flatter underside of the hull along the length of the hull, at least in a central portion of the hull where these units are located. Each landing gear unit typically comprises a flexible outer skirt defined by spaced apart inflatable bag skirts secured to the underside of the hull 2 and comprising bladder means 5, 5' along opposite sides of each unit. The space between the bladder means 5 an 5' is partitioned by three longitudinally spaced apart and flexible transverse skirts 6 to define two air cavities 7 and 7'. Each of the bladder means 5, 5' has along its length second inflatable bladder elements 20, 20' extending below the first inflatable bladers 5, 5', as shown in FIGS. 5–8. Each of the second inflatable bladder elements 20, 20' includes interengageable connecting means in the form of engageable teeth of a zip-type fastener. The connecting means are joined at one end by a sliding member or actuator 21 (see FIG. 7) of a zip-type fastener which is movable by actuating means (not shown) along the length of the landing gear unit to draw the connecting means together and to interlock and connect them together. On movement of the sliding member back to its original position, the connecting means are disconnected from each other. Thus the bladder elements can be "zipped" together or "unzipped" as required to selectively form a cover.

In use the bladder means 5, 5', when in operative configurations, are not connected or "zipped" together and are inflated. Air is supplied to the air cavities 7, 7' to provide air cushions for supporting the air vehicle during landing, taking-off and taxiing procedures. The air supplied to the inflated bladder means 5, 5' may be allowed to escape from inside edges of the latter directly into the air cavities 7, 7' to provide the air cushions. Alternatively or in addition air may be supplied independently into the air cavities. The operative configuration of one of the landing gear units is shown schematically in FIG. 5.

When in flight the bladder means 5, 5' may be at least partially deflated and then connected or "zipped" together (see FIG. 6) so as to be drawn closer to the underside of the hull 2. The space 21 defined inside the joined together bladder means 5, 5' may be partially inflated (see FIG. 7) to stabilise the air cushion landing gear unit in its inoperative condition. In their inoperative configurations the landing gear units are "flattened" towards the underside of the hull 2 and provide a more streamlined profile than when in their operative configurations. In other words the air cushion landing gear units when the aircraft is in flight provide a more efficient aerodynamic surface offering less drag.

Figure 9:
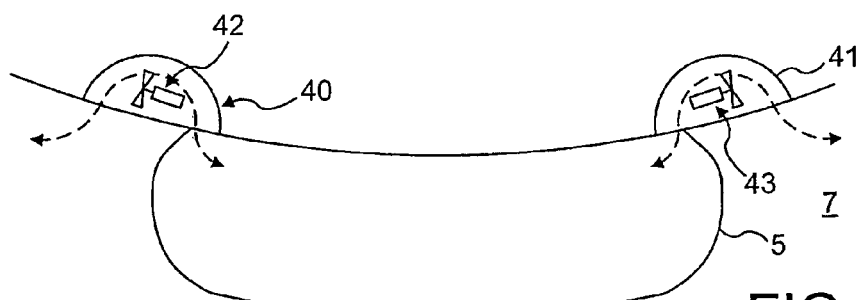
FIG. 9 illustrates schematically how air is supplied into, or withdrawn from, the inside of one of the bladder means of an air cushion unit.

FIG. 9 illustrates schematically how one of the bladder means 5 may be inflated and deflated. As shown two cavities 40 and 41 are housed within, so as to be sealed from, the hull 2 and communicate with the inside of the bladder means 5. By selective operation of fans 42 and 43 driven, for example, by reversible 100 hp motors housed within the cavities 40 and 41, respectively, air can be pumped into and out of the bladder means 5. In particular in the operative configuration, the fan 42 is operable to supply air from outside into the bladder means 5 to inflate the latter. At the same time air may be allowed to pass through the cavity 41, possibly regulated by the fan or valving means (not shown), into the air cavity 7 to provide an air cushion within the air cavity. In the inoperative configuration, either or both of fans 42 and 43 could be operated to remove air from, thereby at least partially deflating, the bladder means 5. When the two bladder means 5, 5' are connected or "zipped" together, the space between the connected together bladder means and the underside of the hull can be partially pressurised by selective use of the fans 42 and 43 to prevent the bladder means from flapping.

When the bladder means are pressurised, air may be rapidly exhausted from each air cavity so that a suction or hold-down force is applied to hold the aircraft down in position on the ground. This suction may be created by operating the fans 42 and 43 so that air is pumped from the air cavities into each of the bladder means 5 and 5'. The relatively widely spaced apart air cushion landing gear units 11, 12, combined with the low height of the hull 2 compared with its length, give the aircraft a high degree of stability when landed enabling elaborate tie-down systems to be dispensed with (although less elaborate tie-down systems may be required in addition to the suck-down air cushion landing gear units).

In each of the FIGS. 1 to 4 landing gear unit 11 is shown with its bladder means pressurised and landing gear unit 12 is shown with its bladder means depressurised. In practice, of course, the bladder means of the two landing gear units 11, 12 would be either both pressurised or both depressurised.

Figure 8:
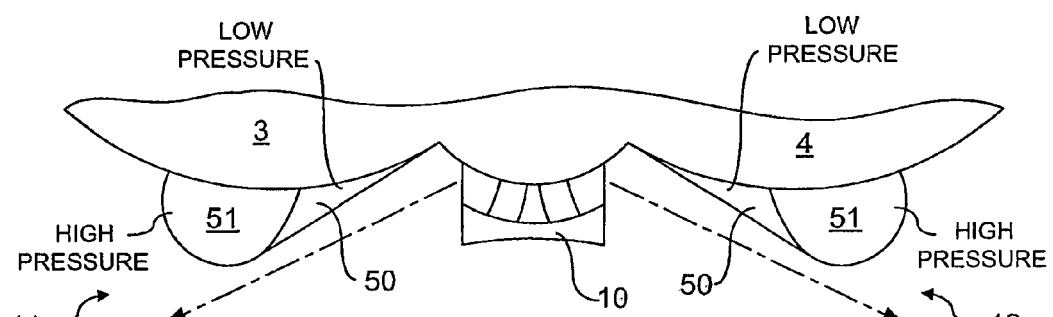
FIG. 8 is a schematic view illustrating an alternative design of air cushion units.

FIG. 8 illustrates how the landing gear units 11 and 12 may be arranged to provide good line of sight for an operator within the payload module 10 in the form of a gondola. Each landing gear unit 11, 12 may be formed of low pressure bag skirts 50 nearest to the gondola and high pressure bag skirts 51 furthest from the gondola. This enables the bag skirt 50 to have a lower profile than that of the bag skirt 51 so as not to obstruct the line of vision from the gondola.

A particular advantage of the use of air cushion landing gear units 11, 12 is that the air vehicle can land and take-off from any reasonably flat surface, including unimproved raw land, swamps, marshland and water, e.g. sea. A special runway is not required as with aircraft having wheeled undercarriages. Furthermore cross-wind landing gear drag is reduced or eliminated. In flight drag is considerably reduced by retraction of the landing gear units. The landing gear units 11 and 12 are positioned widely apart to provide the air vehicle with stability during landing and take-off.

The rear end of the air vehicle is formed by the spaced apart ends of the two side lobes 3 and 4. Motors 13 and 14 are mounted at the stern of the lobes 3 and 4, respectively, and these motors may be designed to control vertical and horizontal movements. Additional motors 15 and 16 are mounted on each side of the hull and are preferably mounted to swivel to provide vertical and horizontal vectoring. The use of vectored thrust engines positioned to allow vertical thrust vectors to act through the centres of gravity and pressure of the hull, enables vertical landing and takeoff of the air vehicle.

Towards the rear end of the hull, four angled stabilising fins 17–20 are arranged.

In use when the aircraft lands and the air within the air cavities is released and suction applied to hold the air aircraft down, the aircraft will settle down gently bringing the payload module 10 close to the ground. The module suitably has a let down ramp (not shown) to allow wheeled vehicles to drive into and off from the payload module in the manner of a roll on/roll off container ship or the like. The low hull height relative to length, coupled with suction provided by the air cushion landing gear units, give the air vehicle a high degree of stability on ground and ease of ground handling.

The aircraft is designed to be able to transport large loads safely over long distances. By way of example, the aircraft described and illustrated typically has a length of 307 m, a height of 77 m and a width of 136 m. Such an aircraft has a hull envelope volume of 2,000,000 $m^3$, a range of 4,000 nautical miles and a flying altitude of up to 9,000 feet. The aircraft typically has a cruise speed of 100 KTAS and a maximum speed of 110 KTAS. The payload is 1,000,000 kg with a deck space 80 m long, 12 m wide and 8 m high.

Smaller versions can be constructed, for example down to payloads of less than one tonne.

The invention claimed is:

1. A lighter-than-air aircraft, comprising:
a gas-filled hull; and
a pair of spaced apart landing gear elements on the underside of the hull arranged on opposite sides of a longitudinally extending central vertical plane of the hull,
wherein each landing gear element comprises:
an air cushion unit, comprising first and second bag skirts extending along opposite sides of the air cushion unit and provided with a releasable connector, an air controller for supplying air to and removing air from at least one of the first and second bag skirts and an actuator operable to move the bag skirts between an operative configuration for containing one or more air cushions and an inoperative configuration.

2. An aircraft according to claim 1, wherein the first and second bag skirts of the two air cushion units, when in their operative configurations, are inflated and extend downwardly from the underside of the hull to define downwardly open air cavities in which the air cushions are created and, when in their inoperative configurations, are positioned closer to the underside of the hull.

3. An aircraft according to claim 1, wherein the actuator is operable to connect the connector together in the inoperative configuration of the first and second bag skirts and to disconnect the connector when the first and second bag skirts are moved into their operative configuration.

4. An aircraft according to claim 3, wherein the first and second bag skirts each have a longitudinally elongated edge and the connector is operable to connect the first and second bag skirts along the length of the longitudinally elongated edge.

5. An aircraft according to claim 3, wherein each bag skirt comprises an inflatable and deflatable bladder secured to the underside of the hull.

6. An aircraft according to claim 5, wherein said air controller is intended to fully inflate the bladder in the operative configurations of the bag skirts with air being fed at the same time into the air cavities to provide the air cushions.

7. An aircraft according to claim 6, wherein means are provided for the escape of air supplied to the bladder means into the air cavities.

8. An aircraft, comprising:
a longitudinally elongated hull configured to receive and enclose a gas that is lighter than air;
a pair of laterally spaced about landing gear elements connected with the hull, each landing gear element comprising:
first and second longitudinally elongated bladders laterally spaced apart from one another;
an air cavity configured to provide an air cushion, wherein the air cavity is formed between the first and second baldders; and
a cover for selectively covering the air cavity, wherein in a first position the cover overlies the air cavity and in a second position at least a portion of the air cavity is uncovered.

9. The aircraft of claim 8 wherein at least a portion of the cover is displaceable between the first and second positions in response to inflation or deflation of the first bladder.

10. The aircraft of claim 8 comprising an air control element operable to control air pressure in the first bladder.

11. The aircraft of claim 10 wherein the air control element comprises a fan.

12. The aircraft of claim 8 wherein the cover comprises a first portion having a free edge and a second portion having a second free edge, wherein in the first position the first and second free edges are connected to one another and in the second position the first and second free edges are spaced apart from one another.

13. The aircraft of claim 8 wherein each landing gear element comprises:
a forward skirt extending between a forward edge of the first bladder and a forward edge of the second bladder; and
a rearward skirt extending between a rearward edge of the first bladder and a rearward edge of the second bladder;
wherein the forward and rearward skirts and first and second bladders form walls enclosing sides of the air cavity for each landing gear element.

14. An aircraft, comprising:
a longitudinally elongated hull configured to receive and enclose a gas that is lighter than air;
a pair of laterally spaced apart landing gear elements connected with the hull, each landing gear element comprising:
a first longitudinally elongated inflatable bladder;
a second longitudinally elongated inflatable bladder;
a skirt defining a border of a downwardly open air cavity adjacent the first and second bladders when the bladders are inflated; and
a cover for selectively covering the air cavity, wherein in a first position the cover covers the air cavity and in a second position at least a portion of the air cavity is uncovered.

15. The aircraft of claim 14 wherein at least a portion of the cover is displaceable between the first and second positions in response to inflation of the first bladder.

16. The aircraft of claim 14 comprising an air control element operable to control air pressure in the first bladder.

17. The aircraft of claim 16 wherein the air control element comprises a fan.

18. The aircraft of claim 14 wherein the cover comprises a first portion having a free edge and a second portion having a second free edge, wherein in the first position the first and second free edges are connected to one another and in the second portion the first and second free edges are spaced apart from one another.

19. The aircraft of claim 14 wherein
the skirt comprises a forward skirt extending between a forward edge of the first bladder and a forward edge of the second bladder; and
each landing gear element comprises a rearward skirt extending between a rearward edge of the first bladder and a rearward edge of the second bladder;
wherein the forward and rearward skirts and first and second bladders form walls enclosing sides of the air cavity for each landing gear element.

20. The aircraft of claim 14 comprising an air supply element operable to supply a flow of air to the air cavity when the cover is in the second position.

* * * * *